(12) United States Patent
Zang

(10) Patent No.: US 11,358,048 B2
(45) Date of Patent: Jun. 14, 2022

(54) ROTATION MECHANISM FOR ELECTRIC BALANCE CAR AND ELECTRIC BALANCE CAR COMPRISING ROTATION MECHANISM

(71) Applicant: ZHEJIANG AERLANG TECHNOLOGY CO., LTD., Zhejiang (CN)

(72) Inventor: Chuanmei Zang, Zhejiang (CN)

(73) Assignee: ZHEJIANG AERLANG TECHNOLOGY CO., LTD., Zhejiang (CN)

(*) Notice: Subject to any disclaimer, the term of this patent is extended or adjusted under 35 U.S.C. 154(b) by 0 days.

(21) Appl. No.: 16/976,440

(22) PCT Filed: Feb. 26, 2019

(86) PCT No.: PCT/CN2019/076153
§ 371 (c)(1),
(2) Date: Aug. 27, 2020

(87) PCT Pub. No.: WO2019/165955
PCT Pub. Date: Sep. 6, 2019

(65) Prior Publication Data
US 2021/0008438 A1 Jan. 14, 2021

(30) Foreign Application Priority Data
Feb. 28, 2018 (CN) .......................... 201820281176.2

(51) Int. Cl.
*A63C 17/12* (2006.01)
*A63C 17/01* (2006.01)

(52) U.S. Cl.
CPC ............ *A63C 17/12* (2013.01); *A63C 17/014* (2013.01); *A63C 2203/12* (2013.01)

(58) Field of Classification Search
CPC ............................. A63C 17/12; A63C 2203/12
See application file for complete search history.

(56) References Cited

U.S. PATENT DOCUMENTS 10,167,036 B2 * 1/2019 Ying ..................... B62K 11/007
10,167,037 B2 * 1/2019 Ying ..................... B62D 51/02
(Continued)

FOREIGN PATENT DOCUMENTS

| CN | 105416468 A | 3/2016 |
|---|---|---|
| CN | 205239800 U | 5/2016 |

(Continued)

OTHER PUBLICATIONS

Supplementary European Search Report dated Oct. 4, 2021 for PCT/CN20190761513, Application No. 19760401.

*Primary Examiner* — Brian L Swenson
(74) *Attorney, Agent, or Firm* — Birch, Stewart, Kolasch & Birch, LLP

(57) ABSTRACT

Disclosed is a rotation mechanism (4) for an electric balance car. The rotation mechanism connects a left car body and a right car body of the electric balance car, and comprises a rotary shaft (40), a sleeve ring (41) and a bearing (42), wherein the sleeve ring (41) is fixedly connected to one side of the rotary shaft (40), the bearing (42) is sheathed on the other side of the rotary shaft (40), and a limiting part (411) is protruded outwardly at a position of an outer edge of the sleeve ring (41). Also disclosed is an electric balance car, comprising the rotation mechanism (4). The rotation mechanism of the electric balance car has a firm and reliable structure, operates smoothly, is convenient to install, and is durable.

15 Claims, 3 Drawing Sheets

(56) References Cited

U.S. PATENT DOCUMENTS

| | | | | |
|---|---|---|---|---|
| 10,722,778 B1* | 7/2020 | Li | ................... | A63C 17/002 |
| 2017/0183053 A1* | 6/2017 | Zeng | ................... | B62K 11/007 |
| 2018/0029662 A1* | 2/2018 | Acciardi | ............... | B62K 21/12 |
| 2019/0023344 A1* | 1/2019 | Shang | ................... | A63C 17/12 |
| 2019/0077479 A1* | 3/2019 | Chen | ................... | B62K 11/007 |

FOREIGN PATENT DOCUMENTS

| | | |
|---|---|---|
| CN | 205365912 U | 7/2016 |
| CN | 205554418 U | 9/2016 |

\* cited by examiner

ROTATION MECHANISM FOR ELECTRIC BALANCE CAR AND ELECTRIC BALANCE CAR COMPRISING ROTATION MECHANISM

BACKGROUND OF THE INVENTION

1. Technical Field

The invention relates to a rotation mechanism for an electric balance car and an electric balance car comprising the rotation mechanism.

2. Description of Related Art

Electric balance cars, which are typically designed based on the principle of "dynamic stability", adopt a gyroscope and an acceleration sensor in the car body to detect attitude changes of the car body and use a servo control system to drive a motor to perform corresponding adjustment to keep the system balanced, are novel, environmentally-friendly tools for riding and recreation. Generally, two-wheeled electric balance cars mainly comprise hub motors provided with wheel axles, pedals disposed between the two hub motors, and the like.

BRIEF SUMMARY OF THE INVENTION

There are many types of electric balance cars at present, but most existing electric balance cars have the following problems: the rotation mechanism is prone to deformation, bending and abrasion under the effect of the gravity of an operator on the electric balance car body; and most existing rotation mechanisms are rotatable with respect to the left car body and right car body of the balance cars, which makes it more difficult for beginners to deftly control such balance cars.

Solution to the Issue

Technical Solution

The invention relates to an electric balance car which solves the afore-mentioned problems, has an ingenious structure, is convenient to install, and is durable.

The invention is implemented through the following technical solution:

A rotation mechanism for an electric balance car connects a left car body and a right car body of the electric balance car, and comprises a rotary shaft and sleeves, wherein the sleeves are disposed around the middle of the rotary shaft, outer surfaces of the sleeves directly or indirectly abut against the left car body and the right car body, and inner surfaces of the sleeves directly or indirectly abut against an outer surface of the rotary shaft.

In this technical solution, the sleeves are disposed in the middle of the rotary shaft and can bear force applied to the rotary shaft by the left car body and the right car body, so that the service life of the rotary shaft is prolonged, the bend resistance of the rotary shaft is improved, and the abrasion of the rotary shaft is reduced.

As a further improvement of the invention, the rotation mechanism for the electric balance car further comprises a sleeve ring and a bearing, wherein the sleeve ring is fixedly connected to one side of the rotary shaft, and the bearing is sheathed on the other side of the rotary shaft. In this technical solution, through the arrangement of the sleeve ring and the bearing, the rotation mechanism can only rotate with respect to the car body located on the same side as the bearing and is fixed with respect to the car body located on the same side as the sleeve ring, so that the controllability of the whole car is improved, and the maintenance cost is reduced.

As a further improvement of the invention, a limiting part is protruded outwardly at a position of an outer edge of the sleeve ring. In this technical solution, the limiting part can restraining the rotary shaft from rotating with respect to the left car body or the right car body so as to fix the rotary shaft with respect to the left car body or the right car body, thus improving the controllability and safety of the car.

As a further improvement of the invention, the cross-section of the limiting part is rectangular. In this technical solution, the limiting part with the rectangular cross-section can fulfill better and firmer limiting and fixation.

As a further improvement of the invention, the number of the sleeves is two, each sleeve has an end provided with a flange, the ends, provided with the flanges, of the two sleeves are close to each other, and ends, not provided with flanges, of the two sleeves are away from each other. In this technical solution, the two sleeves can also improve the bend resistance and abrasion resistance of the rotary shaft.

As a further improvement of the invention, a semicircular limiting plate is disposed at one end of the rotary shaft, and a limiting base for limiting the rotation angle of the semi-circular limiting plate is mounted at a corresponding position of the left car body or the right car body. In this technical solution, the limiting base is also semicircular and can limit the rotation angle of the rotary shaft in cooperation with the semicircular limiting plate.

As a further improvement of the invention, at least one sleeve ring is disposed at the end of one side of the rotary shaft, and at least one bearing is disposed at the end of the other side of the rotary shaft. In this technical solution, one sleeve ring is disposed at the end of one side of the rotary shaft, and one bearing is disposed at the end of the other side of the rotary shaft, so that the rotation mechanism can bear force uniformly and has a compact structure, and the service life of the rotation mechanism is prolonged. A radial groove is formed in the rotary shaft to be connected with the sleeve ring. The sleeve ring can be fixedly connected to the rotary shaft through the radial groove, and the sleeve ring which is generally made of plastic can be can be integrally injection-molded and fixed on the rotary shaft easily through the radial groove.

An electric balance car comprises the rotation mechanism for the electric balance car in any one of the above-mentioned technical solutions, wherein the outer surfaces of the sleeves directly or indirectly abut against the left car body and the right car body, and the inner surfaces of the sleeves directly or indirectly abut against the outer surface of the rotary shaft. In this technical solution, the sleeves can effectively reduce the abrasion of the rotary shaft and improve the bend resistance of the rotary shaft.

As a further improvement of the invention, the left car body and the right car body comprise upper car frames and lower car frames, a first slot is formed in one lower car frame, a second slot is formed in a corresponding position of one upper car frame, and a slot space formed by the first slot and the second slot after the upper car frame and the lower car frame are assembled together is matched with the sleeve ring; and a third slot is formed in the other upper car frame, a fourth slot is formed in a corresponding position of the other lower car frame, and a slot space formed by the third slot and the fourth slot after the upper car frame and the lower car frame are assembled together is matched with the bearing. In this technical solution, the sleeve ring and the bearing are accommodated in the slot spaces formed after the upper car frames and the lower car frames are assembled together, so that axial positioning of the sleeve ring and the bearing is facilitated, and axial movement of the sleeve ring and the bearing is prevented.

As a further improvement of the invention, a notch matched with the limiting part is formed in the first slot. In this technical solution, the limiting part is clamped in the notch to prevent the sleeve ring from rotating, so that the rotary shaft will not rotate with respect to the car body on this side.

A rotation mechanism for an electric balance car connects a left car body and a right car body of the electric balance car, and comprises a rotary shaft, a sleeve ring and a bearing, wherein the sleeve ring is fixedly connected to one side of the rotary shaft, the bearing is sheathed on the other side of the rotary shaft, and a limiting part is protruded outwardly at a position of an outer edge of the sleeve ring. In this technical solution, through the arrangement of the sleeve ring and the bearing, the rotation mechanism can only rotate with respect to the car body located on the same side as the bearing and is fixed with respect to the car body located on the same side as the sleeve ring, so that the controllability of the whole car is improved, and the maintenance cost is reduced. The limiting part can restraining the rotary shaft from rotating with respect to the left car body or the right car body so as to fix the rotary shaft with respect to the left car body or the right car body, thus improving the controllability and safety of the car.

An electric balance car comprises the rotation mechanism for the electric balance car according to the above technical solution, a left car body and a right car body, wherein the left car body and the right car body comprise upper car frames and lower car frames, a first slot is formed in one lower car frame, a second slot is formed in a corresponding position of one upper car frame, and a slot space formed by the first slot and the second slot after the upper car frame and the lower car frame are assembled together is matched with the sleeve ring; and a third slot is formed in the other upper car frame, a fourth slot is formed in a corresponding position of the other lower car frame, and a slot space formed by the third slot and the fourth slot after the upper car frame and the lower car frame are assembled together is matched with the bearing. In this technical solution, the sleeve ring and the bearing are accommodated in the slot spaces formed after the upper car frames and the lower car frames are assembled together, so that axial positioning of the sleeve ring and the bearing is facilitated, and axial movement of the sleeve ring and the bearing is prevented. The limiting part is clamped in the notch to prevent the sleeve ring from rotating, so that the rotary shaft will not rotate with respect to the car body on this side.

As a further improvement of the invention, two sleeves are symmetrically disposed around the middle of the rotary shaft, and each sleeve has an end provided with a flange, and the flanges abut against edges of the corresponding upper car frame and the corresponding lower car frame which are assembled together. Outer surfaces of the sleeves directly or indirectly abut against the left car body and the right car body, and inner surfaces of the sleeves directly or indirectly abut against an outer surface of the rotary shaft. In this technical solution, the sleeves bear force applied by the car bodies, so that the abrasion of the rotary shaft can be effectively reduced, and the bend resistance of the rotary shaft can be improved.

Beneficial Effects of the Invention
Beneficial Effects

Compared with the prior art, the electric balance car of the invention has the following beneficial effects:

The sleeves in the rotation mechanism can bear force applied to the rotary shaft by the car bodies, so that the service life of the rotary shaft is prolonged.

The limiting part on the rotary shaft can effectively prevent the rotary shaft from rotating with respect to the car body on this side, so that the controllability of the balance car is improved. To make the above and other objectives, features and advantages of the invention clearer, the invention is detailed below with reference to preferred embodiments and accompanying drawings.

In the figures: 1, upper car frame; 2, wheel; 3, lower car frame; 4, rotation mechanism; 21, mounting base; 31, light panel; 40, rotary shaft; 41, sleeve ring; 42, bearing; 43, semicircular limiting plate; 44, sleeve; 45, limiting base; 51, touch switch; 52, main circuit board; 53, auxiliary circuit board; 54, auxiliary circuit board support; 55, battery case; 103, fixing base; 108, third slot; 301, first slot; 411, limiting part; 1031, concave groove; 1032, reinforcing rib; 3011, notch.

DETAILED DESCRIPTION OF THE INVENTION

To further expound the technical means adopted to fulfill the objective of the invention and the effects of the invention, the specific implementations, structures, features and effects of the invention are detailed below in conjunction with the accompanying drawings and preferred embodiments.

It should be noted that the terms such as "upper" involved in the description of this application is used to indicate directional or positional relations on the basis of the accompanying drawings to facilitate and simplify the description of this application, do not indicate or imply that the devices or elements referred to must have specific directions or must be configured and operated in specific directions, and thus, should not be construed as limitations of this application.

Unless otherwise clearly specified and defined, the terms such as "mount", "connect" and "fix" in this application should be broadly understood. For example, "connect" may refer to fixed connection, detachable connection or integral connection, or mechanical connection or electrical connection, or direct connection or indirect connection with an intermediate medium, or internal communication of two elements. Those ordinarily skilled in the art can appreciate the specific meanings of these terminals in this application as the case may be.

Embodiment

Figure 1:
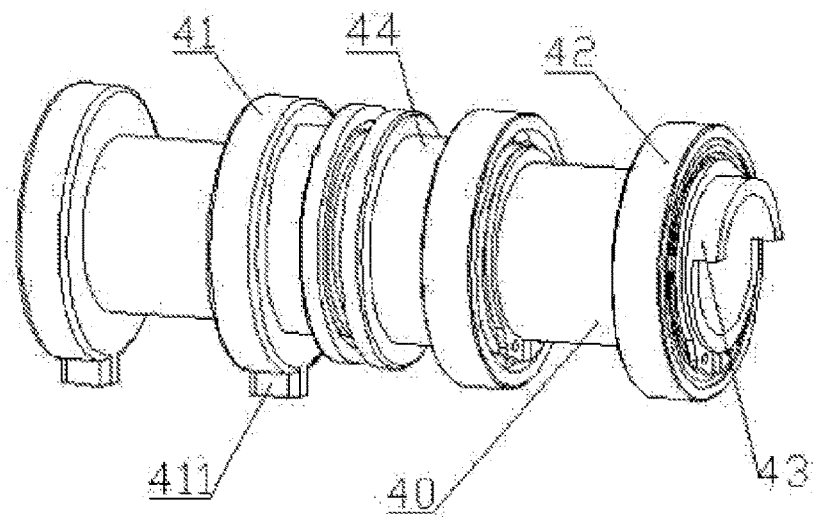
FIG. 1 is structural diagram of a rotation mechanism provided by one embodiment of the invention.
Figure 2:
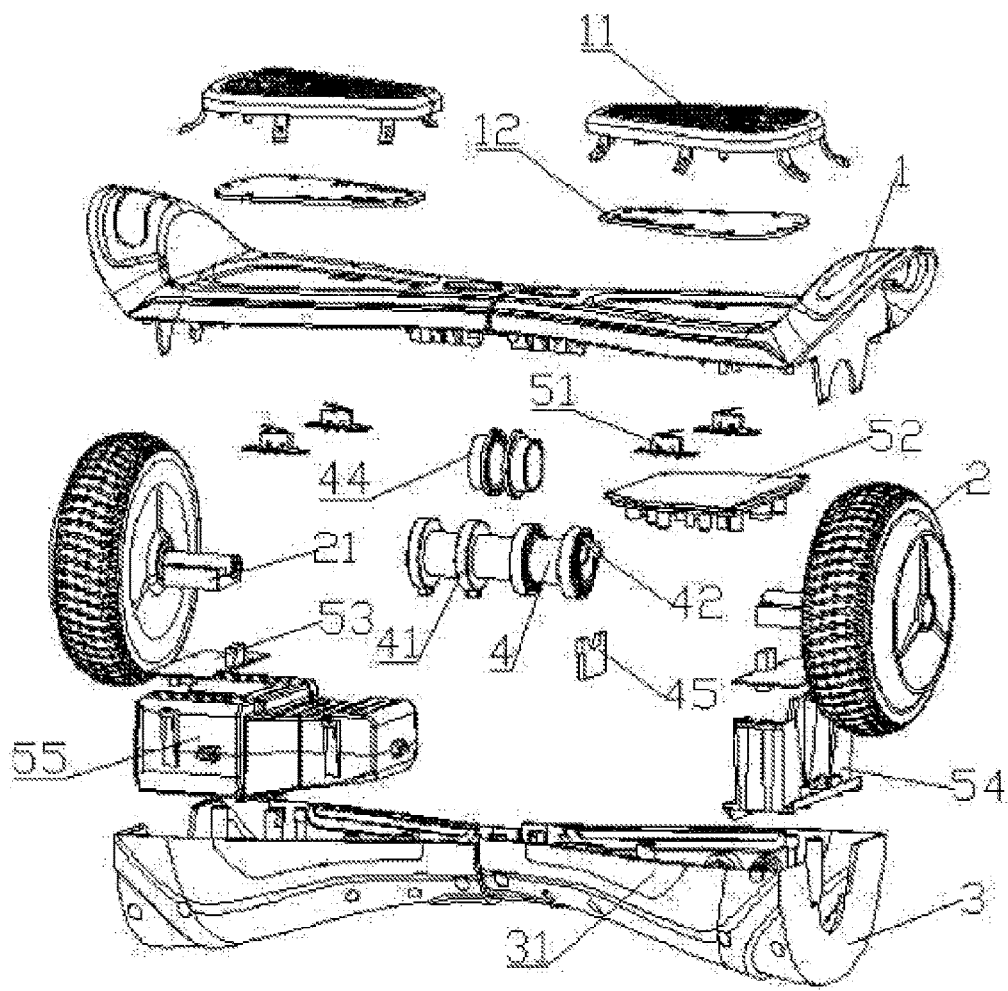
FIG. 2 is a structural diagram of an electric balance car provided by one embodiment of the invention.
Figure 3:
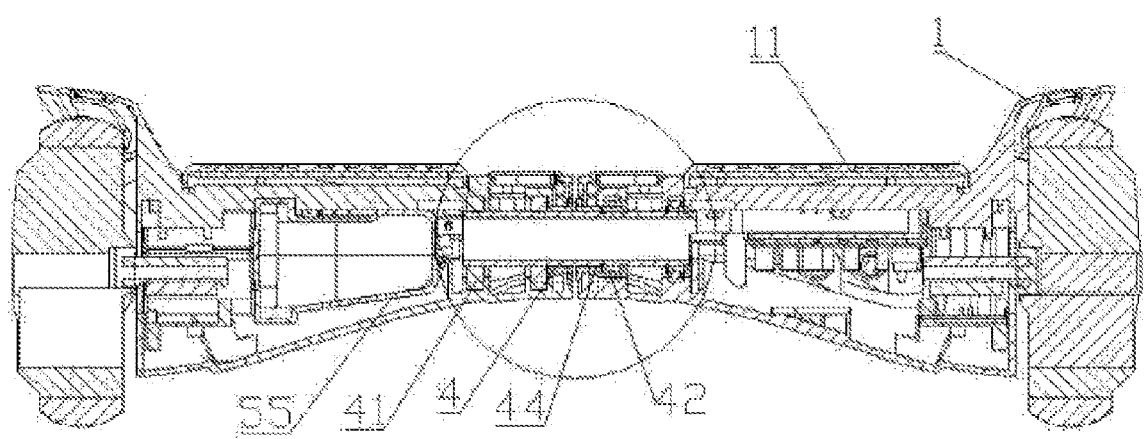
FIG. 3 is a sectional view of an electric balance car provided by one embodiment of the invention.
Figure 4:
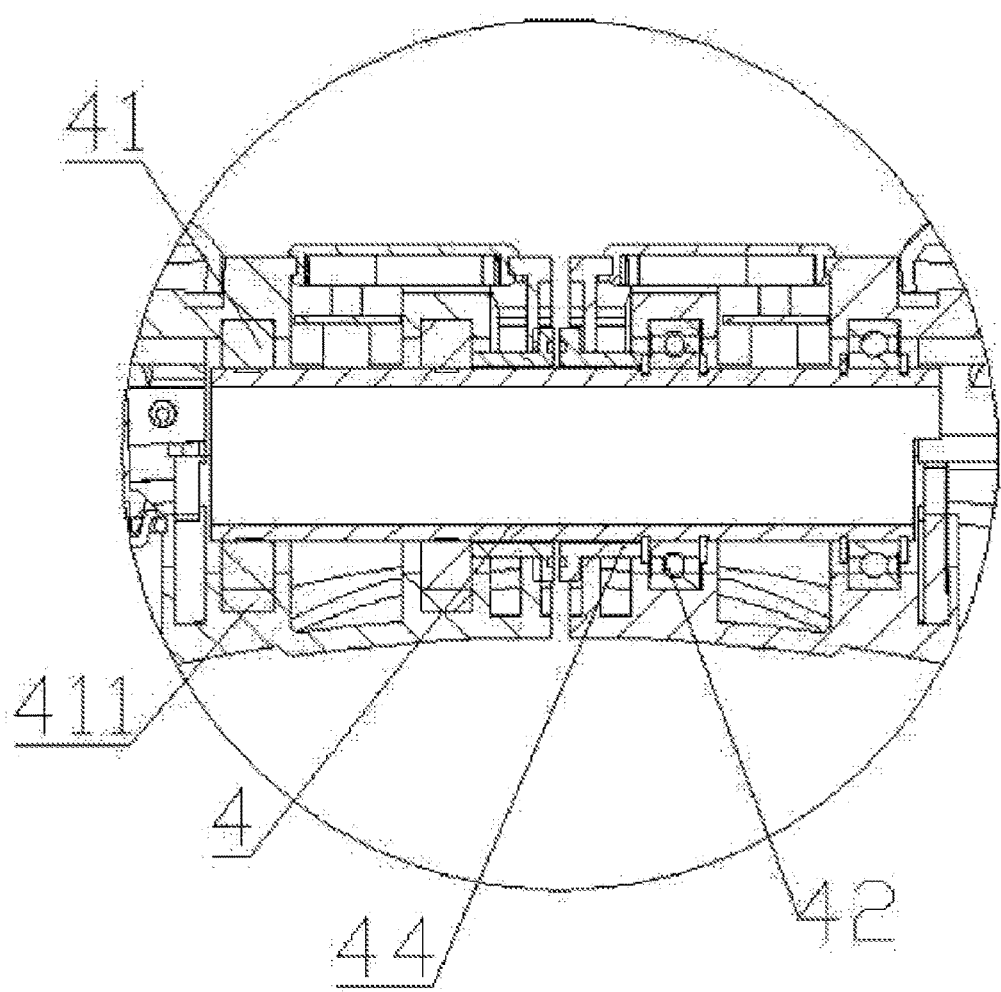
FIG. 4 is a local sectional enlarged view of one embodiment of the invention.
Figure 5:
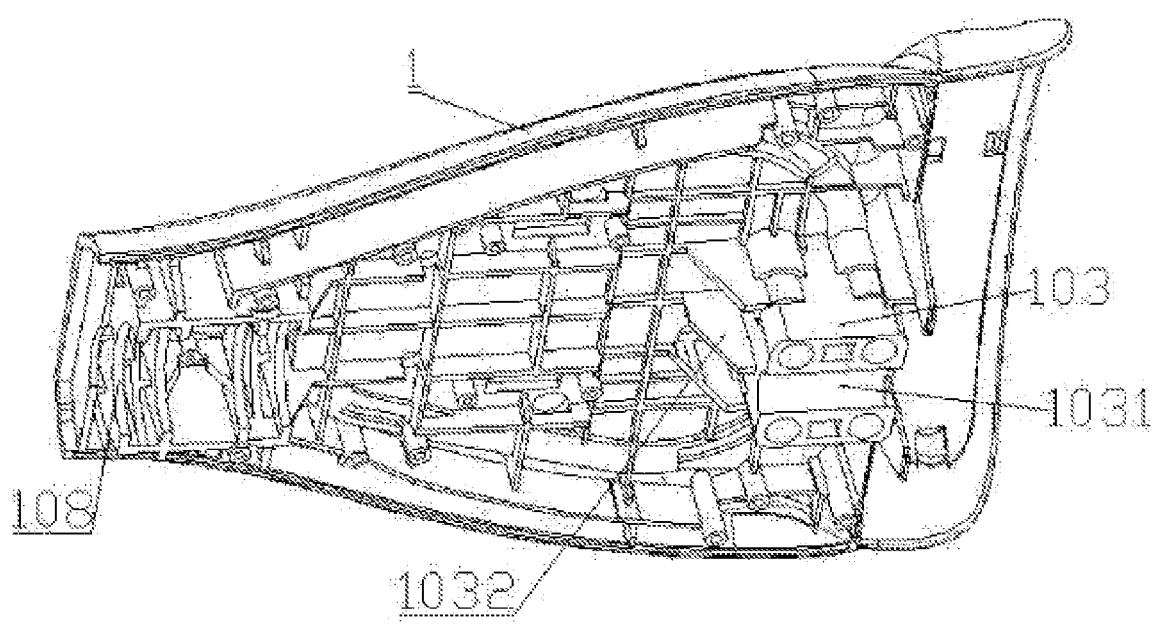
FIG. 5 is a structural diagram of an upper car frame provided by one embodiment of the invention.
Figure 6:
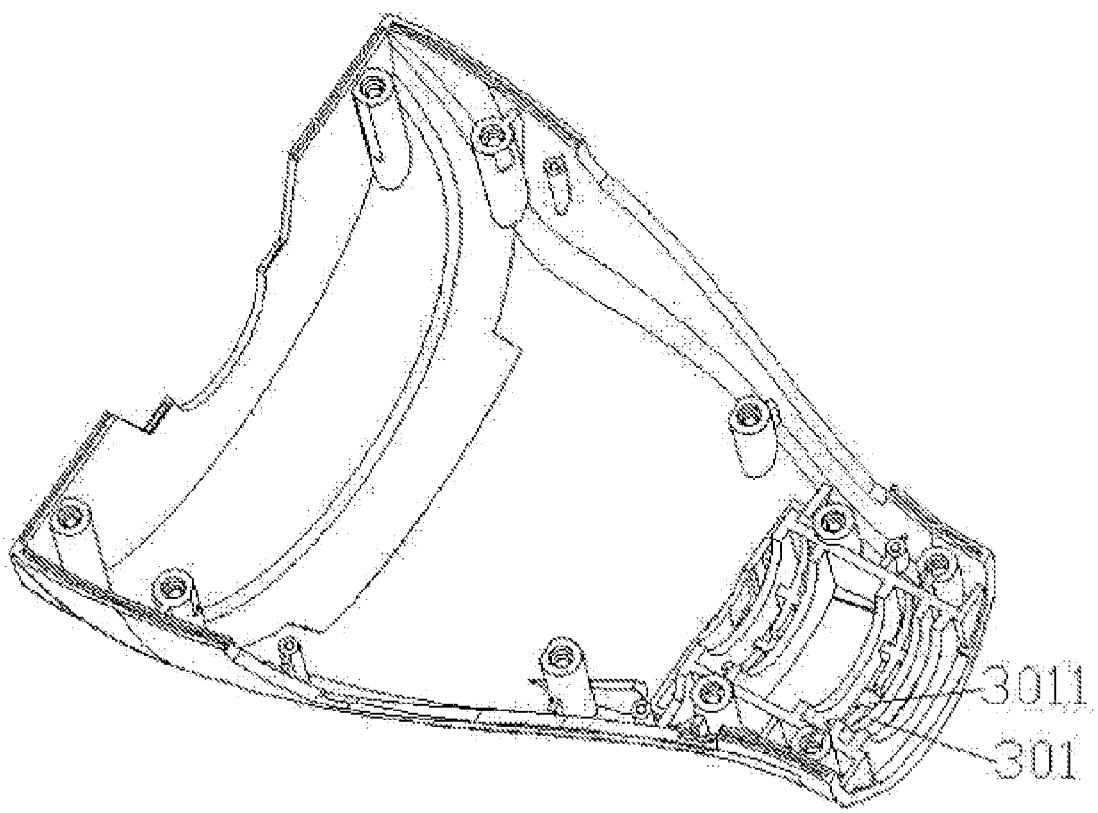
FIG. 6 is a structural diagram of a lower car frame provided by one embodiment of the invention.

Referring to FIG. 1 to FIG. 6, an electric balance car comprises a left car body, a right car body, a rotation mechanism 4, wheels 2 and control parts, wherein the left car body and the right car body are connected through the rotation mechanism 4, the left car body and the right car body comprise upper car frames 1 and lower car frames 3, and after the upper car frames 1 and the lower car frames 3 are assembled together, spaces for mounting wheel 2 axles and the control parts are formed.

The left car body and the right car body are symmetrical in shape. The ends, close to each other, of the two upper car frames 1 are small ends, the ends, away from each other, of the two upper car frames 1 are big ends, and when seen from above, outer edges of the two upper car frames 1 of the electric balance car are approximately in an X shape. The ends, close to each other, of the two lower car frames 3 are small ends, the ends, away from each other, of the two lower car frames 3 are big ends, and when seen from front, outer edges of the two lower car frames 3 are approximately arched.

The rotation mechanism 4 comprises a rotary shaft 40, a sleeve ring 41 and a bearing 42, wherein the sleeve ring 41 is fixedly connected to one side of the rotary shaft 40, the bearing 42 is sheathed on the other side of the rotary shaft 40, a first slot 301 is formed in one lower car frame 3, a second slot is formed in a corresponding position of one upper car frame, and after the upper car frame and the lower car frame are assembled together, a slot space formed by the first slot and the second slot is matched with the sleeve ring 41; a limiting part (411) is protruded outwardly at a position of an outer edge of the sleeve ring (41), and the cross-section of the limiting part is rectangular or in other irregular shapes. When assembled, the sleeve ring 41 in the rotation mechanism 4, together with the limiting part on the sleeve ring, is clamped in the corresponding slot of the car body, and a notch 3011 matched with the limiting part is formed in the corresponding slot, namely first slot 301, of the car body to prevent the rotary shaft 40 from rotating with respect to the car body; a third slot 108 is formed in the other upper car frame 1, a fourth slot is formed in a corresponding position of the other lower car frame, and after the upper car frame and the lower car frame are assembled together, a slot space formed by the third slot 108 and the fourth slot is matched with the bearing 42; and the rotary shaft 40 can rotate with respect to the car body on this side through the bearing 42. Two sleeves 44 are symmetrically disposed around the middle of the rotary shaft 40, a flange is disposed at one end of each sleeve, and the flanges abut against the edges after the upper car frame 1 and the lower car frame 3 are assembled together, the other end of one sleeve 44 abuts against the sleeve ring 41, and the other end of the other sleeve 44 abuts against the bearing 42. The rotary shaft 40 is in the shape of a hollow tube and allows a line to pass through.

Each control part comprises a main circuit board 52, auxiliary circuit boards 53, touch switches 51 and a battery, wherein the battery is mounted on one upper car frame 1 through a battery case 55, the main circuit board 52 is mounted on the upper car frame 1, one auxiliary circuit board 53 is mounted at the bottom of an auxiliary circuit board support 54 disposed on the upper car frame 1, and one auxiliary circuit board 53 is mounted at the bottom of the battery case 55; the touch switches 51 are mounted on the upper car frame 1, and openings allowing the upper ends of the touch switches 51 to stretch out are formed in the upper car frame 1; the auxiliary circuit board support 54 comprises a horizontal plate and two support legs connected with the horizontal plate, connecting plates for enhancing the strength of the auxiliary circuit board support 54 are disposed at the two ends of each support leg and connect the horizontal plate and the support legs, and the two support legs are fixedly mounted on the upper car frame 1 through first fixing columns; one auxiliary circuit board 53 is mounted on a second fixing column below the horizontal plate, and a space for dislocation of a wheel 2 axle is reserved between the two support legs; the main circuit board 52 is electrically connected with the auxiliary circuit boards 53, and the auxiliary circuit boards 53 are eclectically connected with touch switches 51; the battery case 55 has a head part and two root parts and is approximately shaped like Chinese character "pin", and a space is reserved between the two root parts to allow the wheel axle to be mounted on the upper car frame; the battery case 55 comprises an upper battery case and a lower battery case which are buckled together, a buckle hole is formed in the upper battery case, a buckle protrusion is disposed at a corresponding position of the lower battery case 5, and after the upper battery case and the lower battery case are assembled together, the buckle protrusion stretches out of the buckle hole and is locked in the buckle hole; first heat dissipation holes are formed in the upper battery case, and second heat dissipation holes are formed in the lower battery case; and mounting lugs for fixing the battery case 55 on the upper car frame 1 are disposed on a peripheral wall of the lower battery case, and fixing lugs for mounting and fixing the corresponding auxiliary circuit board are disposed at the bottom of the lower battery case.

Pedals 11 are mounted on upper portions of the upper car frames 1 and are able to indirectly or directly contact with the touch switches 51 under the effect of external force. Each pedal 11 has a convex part located on the edge, and a concave part located in the middle and used to restore the pedal 11 after the pedal 11 descends under the effect of acting force. Fixing strips are disposed on the convex parts on the edges of the pedals 11, fixing holes allowing fasteners to penetrate through are formed in the fixing strips, bumps matched with the concave parts of the pedals 11 are disposed on the upper car frames 1, grooves matched with the convex parts on the edges of the pedals 11 are formed in the upper car frames 1 and encircle edges of the bumps, upper surfaces of the bumps are lower than upper surfaces of the upper car frames 1, and first through holes allowing the fixing strips to penetrate through are formed in the grooves. Guide columns are disposed on the concave parts in the middle of the pedals 11, gaskets 12 are disposed between the pedals 11 and the touch switches 51, second through holes allowing the guide columns to penetrate through are formed in corresponding positions of the gaskets 12, and the gaskets 12 can guide the guide columns to allow the pedals 11 to reciprocate upwards and downwards. The openings are formed in the bumps to allow the upper ends of the touch switches to penetrate through. The number of the fixing strips is at least two, the ends, close to the pedals, of the fixing strips are big ends, and the end, away from the pedals, of the fixing strips are small ends.

Fenders which extend outwardly are disposed on the upper car frames 1, cover the wheels 2 and are matched with the wheels in shape, first grooves for accommodating light panels are formed in upper surfaces of the fenders, second grooves for accommodating light panels 31 are formed in front surfaces of the lower car frames 3, and the upper car frames 1 and the lower car frames 3 are connected through fasteners such as screws after being assembled together.

The axes of the wheels 2 axles are lower than the axis of the rotary shaft 40 in the rotation mechanism 4. A semicircular limiting plate 43 is disposed at one end of the rotary shaft 40, and a limiting base 45 for limiting the rotation angle of the semicircular limiting plate 43 is mounted on the corresponding upper car frame 1 or the corresponding lower car frame 3. An upper portion of the limiting base 45 is semicircular, and two semicircular ends of the limiting base 45 abut against the semicircular limiting plate 43 to limit the rotation range of the rotary shaft 40.

Fixing bases 103 for mounting the wheel 2 axles are disposed on the upper car frames 1, and concave grooves 1031 matched with cross-sections of the wheel axles are disposed on the lower surfaces of the fixing bases 103. The wheel 2 axles are mounted on the fixing bases 103 through mounting bases 21, grooves which are matched with the cross-sections of the wheel axles are formed in the mounting bases 21 to prevent the wheel axles against rotation, the fixing bases 103 and the upper car frames 1 may be integrally formed, and reinforcing ribs 1032 are disposed on formed parts to improve the strength of the formed parts. Or, the fixing bases 103 are detachably and fixedly connected with the upper car frames 1, the height difference between the rotation axis of the rotation mechanism and the center axes of the wheel axles can be adjusted as actually needed, and the fixing bases 103 and the mounting bases 21 are connected through fasteners such as screws.

The electric balance car of the invention is ingenious in structure, reasonable in design and suitable for industrial application.

When the electric balance car is used, an operator steps on the pedals 11 and controls, with feet, the pedals to move forwards and downwards or to move backwards and downwards to contact with the touch switches 51, electric signals generated by the touch switches 51 are transmitted to the auxiliary circuit boards 53 to be processed, and then, the whole car is controlled by the main control boards 52 to move forwards or backwards or to make a turn.

The above embodiments are merely preferred ones of the invention, and are not meant to limit the invention in any form. Although the invention has been disclosed above with reference to the preferred embodiments, these embodiments are not intended to limit the invention. Any skilled in the art can obtain other equivalent embodiments by making some transformations or modifications according to the technical contents disclosed above, and any simple transformations or equivalent alterations or modifications made according to the technical essence without deviating from the contents of the technical solution of the invention should also fall within the scope of the technical solution of the invention.

What is claimed is:

1. A rotation mechanism for an electric balance car, connecting a left car body and a right car body of the electric balance car, and comprising a rotary shaft (40) and sleeves (44), wherein the sleeves (44) are disposed around a middle of the rotary shaft (40), outer surfaces of the sleeves (44) directly or indirectly abut against the left car body and the right car body, and inner surfaces of the sleeves (44) directly or indirectly abut against an outer surface of the rotary shaft (40), wherein a semicircular limiting plate (43) is disposed at one end of the rotary shaft (40), and a limiting base (45) for limiting a rotation angle of the semicircular limiting plate (43) is mounted at a corresponding position of the left car body or the right car body.

2. The rotation mechanism for the electric balance car according to claim 1, further comprising a sleeve ring (41) and a bearing (42), wherein the sleeve ring (41) is fixedly connected to one side of the rotary shaft (40), and the bearing (42) is sheathed on another side of the rotary shaft (40).

3. The rotation mechanism for the electric balance car according to claim 2, wherein a limiting part (411) is protruded outwardly at a position of an outer edge of the sleeve ring (41).

4. The rotation mechanism for the electric balance car according to claim 3, wherein a cross-section of the limiting part (411) is rectangular.

5. The rotation mechanism for the electric balance car according to claim 4, wherein at least one said sleeve ring (41) is disposed at an end of one side of the rotary shaft, and at least one said bearing (42) is disposed at an end of the other side of the rotary shaft (40).

6. The rotation mechanism for the electric balance car according to claim 3, wherein at least one said sleeve ring (41) is disposed at an end of one side of the rotary shaft, and at least one said bearing (42) is disposed at an end of the other side of the rotary shaft (40).

7. The rotation mechanism for the electric balance car according to claim 2, wherein at least one said sleeve ring (41) is disposed at an end of one side of the rotary shaft, and at least one said bearing (42) is disposed at an end of the other side of the rotary shaft (40).

8. An electric balance car, comprising the rotation mechanism for the electric balance car according to claim 2, wherein the outer surfaces of the sleeves (44) directly or indirectly abut against the left car body and the right car body, and the inner surfaces of the sleeves (44) directly or indirectly abut against the outer surface of the rotary shaft (40).

9. The rotation mechanism for the electric balance car according to claim 1, wherein the number of the sleeves (44) is two, each said sleeve (44) has an end provided with a flange, the ends, provided with the flanges, of the two sleeves (44) are close to each other, and ends, not provided with flanges, of the two sleeves (44) are away from each other.

10. An electric balance car, comprising the rotation mechanism for the electric balance car according to claim 1, wherein the outer surfaces of the sleeves (44) directly or indirectly abut against the left car body and the right car body, and the inner surfaces of the sleeves (44) directly or indirectly abut against the outer surface of the rotary shaft (40).

11. The electric balance car according to claim 10, wherein a left car body and a right car body comprise upper car frames (1) and lower car frames (3), a first slot (301) is formed in one said lower car frame (3), a second slot is formed in a corresponding position of one said upper car frame (1), and a slot space formed by the first slot (301) and the second slot after the upper car frame and the lower car frame are assembled together is matched with the sleeve ring (41); and a third slot (108) is formed in the other upper car frame (1), a fourth slot is formed in a corresponding position of the other lower car frame, and a slot space formed by the third slot (108) and the fourth slot after the upper car frame (1) and the lower car frame are assembled together is matched with the bearing (42).

12. The electric balance car according to claim 11, wherein a notch (3011) matched with the limiting part (411) is formed in the first slot (301).

13. A rotation mechanism for an electric balance car, connecting a left car body and a right car body of the electric balance car, and comprising a rotary shaft (40), a sleeve ring (41) and a bearing (42), wherein the sleeve ring (41) is fixedly connected to one side of the rotary shaft (40), the bearing (42) is sheathed on another side of the rotary shaft (40), and a limiting part (411) is protruded outwardly at a position of an outer edge of the sleeve ring (41).

14. An electric balance car, comprising the rotation mechanism for the electric balance car according to claim 13, a left car body and a right car body, wherein the left car body and the right car body comprise upper car frames (1) and lower car frames (3), a first slot (301) is formed in one said lower car frame (3), a second slot are formed in a corresponding position of one said upper car frame (1), and a slot space formed by the first slot (301) and the second slot after the upper car frame and the lower car frame are assembled together is matched with the sleeve ring (41); and a third slot (108) is formed in the other upper car frame (1), a fourth slot is formed in a corresponding position of the other lower car frame, and a slot space formed by the third slot (108) and the fourth slot after the upper car frame and the lower car frame are assembled together is matched with the bearing (42), and a notch (3011) matched with the limiting part (411) is formed in the first slot (301).

15. The electric balance car according to claim 14, wherein two sleeves (44) are symmetrically disposed around a middle of the rotary shaft (40), and each said sleeve has an end provided with a flange, and the flanges abut against edges of the corresponding upper car frame (1) and the corresponding lower car frame (3) which are assembled together.

\* \* \* \* \*